United States Patent [19]
Richardson et al.

[11] Patent Number: 5,480,616
[45] Date of Patent: Jan. 2, 1996

[54] POLYCONDENSATION APPARATUS

[75] Inventors: Joel A. Richardson, Naperville; Wassily Poppe, Lombard; Benjamin A. Bolton; Edward E. Paschke, both of Wheaton, all of Ill.

[73] Assignee: Amoco Corporation, Chicago, Ill.

[21] Appl. No.: 280,702

[22] Filed: Jul. 26, 1994

Related U.S. Application Data

[63] Continuation of Ser. No. 970,577, Nov. 3, 1992, abandoned, which is a continuation of Ser. No. 651,475, Feb. 6, 1991, abandoned, which is a continuation of Ser. No. 350,147, May 10, 1989, abandoned, which is a division of Ser. No. 47,905, May 7, 1987, Pat. No. 4,831,108, which is a continuation of Ser. No. 715,609, Mar. 25, 1985, abandoned, which is a continuation-in-part of Ser. No. 640,672, Aug. 13, 1984, abandoned, which is a continuation of Ser. No. 466,904, Feb. 16, 1983, abandoned.

[51] Int. Cl.$^6$ .................................. C08F 2/00; B01J 8/04
[52] U.S. Cl. ........................ 422/134; 422/137; 422/138; 422/197
[58] Field of Search .................... 422/134, 137, 422/138, 196, 197, 312; 526/65; 528/335

[56] References Cited

U.S. PATENT DOCUMENTS

| | | |
|---|---|---|
| 2,658,054 | 11/1953 | Coleman et al. . |
| 3,513,145 | 5/1970 | Crawford . |
| 3,600,137 | 8/1971 | Girantet et al. . |
| 3,719,643 | 3/1973 | Knight . |
| 4,060,517 | 11/1977 | Mertes et al. . |
| 4,299,498 | 11/1981 | Sauerbrunn . |

*Primary Examiner*—Robert J. Warden
*Assistant Examiner*—Christopher Y. Kim
*Attorney, Agent, or Firm*—Stephen L. Hensley

[57] ABSTRACT

A process for preparing condensation polymers comprises forming a dispersion of a reaction mixture in a continuous vapor phase, maintaining the dispersion while passing it through a reaction zone, heating the dispersion in the reaction zone to polymerize reactants in the reaction mixture and form a polycondensate.

14 Claims, 2 Drawing Sheets

POLYCONDENSATION APPARATUS

This is a continuation of application Ser. No. 07/970,557, filed Nov. 3, 1992, abandoned which in turn is a continuation of 07/651,475 filed Feb. 6, 1991, abandoned which in turn is a continuation of 350,147 filed May 10, 1989, abandoned which is a divisional of 047,905 filed May 7, 1987, U.S. Pat. No. 4,831,108, which is a continuation of 715,609 filed Mar. 25, 1985, abandoned which is a continuation in part of 640,672 filed Aug. 13, 1984, abandoned which in turn is a continuation of 466,904 filed Feb. 16, 1983, abandoned.

BACKGROUND OF THE INVENTION

The field of this invention relates to a polycondensation process and apparatus for the manufacture of polymers from a mixture of starting materials using a high-temperature system wherein the polymerization is conducted in a dispersion which is in a turbulent flow or drop-flow regime. The dispersion is passed through a reaction zone in which heat is introduced to polymerize the starting materials and form a polycondensate. The process is suitable for the manufacture of polyesters, polycarbonates, polyarylates, polyestercarbonates, polyamines, polyamide-imides, polyamides, and other condensation polymers. This novel process is applicable to any polycondensation reaction provided the mixture of the starting materials is essentially homogeneous. Also, the mixture of starting materials, or the salt or prepolymer which is formed upon combination of the starting materials, must be stable under the high reaction temperatures and be capable of forming a dispersion in a vapor phase.

A process for the vapor-phase condensation polymerization of aromatic polyamides is disclosed by Shin in U.S. Pat. No. 4,009,153 (1977). In this process vaporized monomers are diluted with an inert gas and then mixed and reacted in a reaction zone heated in the range of 150° C. to 500° C. One type of reactor described is a so-called "space reactor" in which the residence time is low, preferably less than 5 seconds. The polymerization is presumed to occur in space and not on the reactor walls. This process has a number of disadvantages. First, the reaction zone must be maintained at a high temperature in order to keep the monomers in vapor phase. These high temperatures limit the polymers which can be produced to those which will not decompose. Second, there is only about 20 percent reaction of the monomers per pass through the reaction zone (see Example 6). This means that there must be a large monomer recovery and recycle section in the process which is commercially undesirable.

A large number of processes have been disclosed in the prior art which attempt to provide a continuous method for preparing polycondensation polymers. U.S. Pat. No. 4,060,517 of Mertes et al. (1977) provides a review of a number of these processes and is incorporated herein by reference. The prior art processes which involve a flashing step can be divided into two categories. In the first category, a mixture of starting materials is heated under pressure and then flashed while attempting to maintain isothermal conditions. In the second group of processes, there is an adiabatic release of pressure with accompanying release of all the volatile components.

Among the prior art processes in the first category is that of Taul et al., in U.S. Pat. No. 3,027,355 (1962), who disclose a method for removing water from a concentrated, polyamide-forming condensate. This method involves flashing the condensate through nozzles directed so as to force impingement of the condensate against an extensive, heated metal surface to minimize the heat loss of the condensate. The foam-like product then flows downward over the heated surfaces into a heated processing vessel in which the polymerization is completed.

Carter, in U.S. Pat. No. 3,193,535 (1965) and Canadian Patent 800,061 (1968), describes a process in which a solution is subjected to a gradual reduction in pressure as it passes through a heated tube in order to remove water vapor. There is no abrupt or sudden fall in pressure along the tube. The cross-section of the heated tube ordinarily increases stepwise throughout its length to provide the continual reduction in pressure. Heckert, in U.S. Pat. No. 2,689,839 (1954), describes a method of gradually reducing pressure in molten polymer by passing it through a long tube of successively increasing diameter. Parnell, in U.S. Pat. No. 3,257,173 (1966), Griffiths, in U.S. Pat. No. 3,258,313 (1963), and Iwasyk, in U.S. Pat. No. 3,948,862 (1976), describe modifications in this process and apparatus. As set forth in column 3, line 8 of Iwasyk, this process provides a two-phase annular flow in the long tube or "flashing reactor".

Taylor, in U.S. Pat. No. 2,361,717 (1944), discloses a process in which the pressure release is carried out semi-adiabatically and semi-isothermally. The heated reaction mixture is passed through a valve and flashed into a heated coil. The resulting mixture of steam and polymer is passed through the coil and into a trap from which the molten polymer is withdrawn. The residence time of the polymer in the steam-flashing stage is about 1 to about 5 minutes, as taught in the first column of page 3, lines 23 through 34. Additionally, it can be determined from the examples that the specific mass flow rate (as defined hereinbelow) is about 41 pounds per hour per square inch.

The second category of processes which utilizes adiabatic release of pressure is exemplified by Mertes et al. (cited hereinabove), Clemo et al., U.S. Pat. No. 3,185,672 (1965) and Doerfel et al., U.S. Pat. No. 4,049,638 (1977). Clemo discloses a process for the manufacture of polyamides which involves pumping a hot aqueous salt solution through a pressure tube at polyamide-forming temperatures under a pressure sufficient to prevent the evolution of steam until a degree of polymerization of about 1.15 to 1.37 is obtained and then the solution is adiabatically flashed into a chamber at atmospheric pressure. As taught in col. 3, lines 47 through 55, this flashing is accomplished by passing the prepolymer solution through a jet or a valve or other spraying device to form small droplets. The droplets of the spray rapidly contact the surface of the chamber, the molten mixture of salt and polyamide flows down the sides of the heated chamber and the melt collects in the bottom of the chamber to be forwarded by a pump to another vessel in which the process of polymerization is completed. This adiabatic flashing step serves as a method of pressure reduction and also water removal in the process.

Mertes et al. disclose a process for preparing polyamides in which a mixture of starting materials is heated in a first reaction zone until the conversion is at least 80 percent. The product is then passed to a second zone where the pressure is adiabatically released. The polycondensation mixture is then transferred into a heat exchanger such as a tube bundle heat exchanger and rapidly heated to between 220° C. and 330° C. in less than 5 minutes, preferably in less than one minute, to evaporate the bulk of water. The resulting product is then passed into a post-condensation zone, for example, a self-purging, twin-screw reactor and additional condensation reaction is carried out to give the desired molecular weight.

Doerfel discloses a process for producing polyamides in which reactants are contacted in a precondensation zone until polymerized to a conversion of at least 70 percent. This mixture is then adiabatically flashed into a heat exchanger such as a cascade-connected tubular heat exchanger. The material leaving the heat exchanger passes into another reaction vessel where volatiles are removed and the molecular weight is increased. In this process, the vapor flow through the heat exchanger is not maintained at a high enough level to achieve and maintain the condensate as a dispersion, i.e., the condensate contacts the heat exchanger as a liquid film.

Other patents which might be of interest relating to flashing include: Brignac, U.S. Pat. No. 3,501,441 (1970) and U.S. Pat. No. 3,300,449 (1967); Sovereign, U.S. Pat. No. 3,218,297 (1965); Lodge, U.S. Pat. No. 3,278,494 (1966); Jaswal et al., U.S. Pat. No. 3,900,450 (1975); Hawkins, U.S. Pat. No. 3,195,613 (1965); and Coggeshall, U.S. Pat. No. 3,260,703 (1966).

Other patents which disclose tubular reactors include: Parker et al., U.S. Pat. No. 3,241,926 (1966); Brill et al., U.S. Pat. No. 3,192,184 (1965); Wise et al., U.S. Pat. No. 2,018,771 (1935); Girantet et al., U.S. Pat. No. 3,600,137 (1971); Hellemanns et al., U.S. Pat. No. 3,880,921 (1975); Greene, U.S. Pat. No. 4,221,763 (1980); Pinney, U.S. Pat. No. 3,960,820 (1976); and Tare, U.S. Pat. No. 3,296,217 (1967).

The prior art systems require significantly longer residence times than the instant invention. This limits the temperature at which the processes can be operated since the polymer may degrade at the longer residence time. The lower operating temperatures also limit the polymers which can be prepared by the prior art processes; additionally, many of the designs are complex and expensive. Consequently, a process is needed having a simple design which allows a short residence time of material in the system and can therefore operate at much higher temperatures. Also, a process is needed which can be used to prepare a wide range of condensation polymers having different melt viscosities without major process changes.

SUMMARY OF THE INVENTION

The general object of this invention is to provide a polycondensation process and apparatus in which the polycondensate has a short residence time. A more particular object is to provide a condensation process which can be utilized to prepare a variety of polycondensates having different melt viscosities. Further objects will be apparent from the description of the invention hereunder.

These objects can be accomplished by a process for preparing a polycondensate in which the process comprises combining reactants to form a reaction mixture, forming a dispersion of said reaction mixture in a continuous vapor phase, maintaining the dispersion while passing it through a reaction zone, and heating the dispersion in said reaction zone to polymerize said reactants and form the polycondensate.

These objects can be further accomplished by a process for preparing a polycondensate which comprises combining reactants to form a reaction mixture, transferring the mixture to a preflash zone in which the mixture is heated to a temperature no greater than the lesser of the decomposition temperature of the mixture or the decomposition temperature of the polycondensate, said heating accomplished at a pressure sufficient to avoid formation of a vapor phase, passing the reaction mixture from said preflash zone to a zone of lower pressure to vaporize a volatile component and establish a dispersion of the reaction mixture in a drop-flow regime, passing the dispersion into a reaction zone, heating the dispersion in the reaction zone to provide at least a 10 percent increase in extent of reaction compared to that in the preflash zone and form the polycondensate, and maintaining the dispersion containing the polycondensate in a drop-flow regime while passing it through the reaction zone.

These objects can also be accomplished by a process for preparing a polycondensate comprising combining starting materials to form a mixture, transferring said mixture to a preflash zone in which said mixture is maintained for a time sufficient to heat the mixture to a temperature no greater than the lesser of the decomposition temperature of the mixture or the decomposition temperature of said polycondensate, said heating accomplished at a pressure sufficient to avoid formation of a vapor phase, passing the mixture from said preflash zone through an orifice to a zone of lower pressure to substantially vaporize a volatile component in the mixture, passing said mixture into a reaction zone, providing a specific mass flow rate greater than about 60 pounds per hour per square inch in said reaction zone, introducing heat in said reaction zone to increase the mean temperature of said mixture to a temperature sufficient to provide at least a 10 percent increase in extent of reaction compared to that in the preflash zone and form a polycondensate product, and removing said polycondensate product and vapor phase from said reaction zone.

These objects can further be accomplished by a process for preparing a polycondensate comprising combining starting materials to form a mixture, transferring said mixture to a preflash zone in which said mixture is maintained for a time sufficient to heat the mixture to a temperature no greater than the lesser of the decomposition temperature of the mixture or the decomposition temperature of said polycondensate, said heating accomplished at a pressure sufficient to avoid formation of a vapor phase, passing the mixture from said preflash zone through an orifice to a zone of about 0–400 psig pressure to form a dispersion, passing said dispersion into a reactor designed to provide a high heat flux with wall temperatures of about 400° F. to about 1000° F. and mean dispersion temperatures of about 350° F. to about 750° F. and a mean dispersion residence time in the reactor of about 0.1 seconds to about 45 seconds.

These objects are also accomplished in an apparatus for practicing the instant process which comprises: a mixing means for mixing reactants to form a feed mixture; a pressurizing means connected to said mixing means for pressurizing said feed mixture; a heating means for receiving said pressurized feed mixture from said pressurizing means and heating said mixture; a reactor connected to said heating means for heating a dispersion formed from said feed mixture; a means for forming a dispersion from said feed mixture, said means located at the entrance to said reactor; and a throttling means located at the exit from said reactor to control the pressure in said reactor.

BRIEF DESCRIPTION OF THE DRAWING

Accompanying and forming part of the disclosure is a drawing comprising:

FIG. 2, a schematic of apparatus useful for the instant process; and

DETAILED DESCRIPTION OF THE INVENTION

As stated hereinabove, the prior art discloses flashing a reaction mixture in order to reduce the pressure and remove volatile components. These processes disclose flashing the reaction mixture through nozzles so that the spray immediately contacts a heated surface to form a melt on the heated surface, e.g., Clemo, et al., Doerfel and Taul, et al. Other prior art processes, such as Carter, Heckert and Parnell, use a gradual reduction in pressure. None of these suggest or disclose heating the spray or aerosol to promote the polymerization while maintaining the aerosol. Taylor does disclose heating the mixture of steam and polymer that is formed after flashing. However, there is no suggestion that the polymer is present as an aerosol and the high residence time (1 to 5 minutes) and low specific mass flow rate (41 pounds per hour per square inch calculated from the examples) suggests it is not an aerosol.

In view of the teachings of the prior art, it is surprising that a process which utilizes an aerosol or "drop-flow regime" (as defined hereinbelow) could be successfully used to prepare condensation polymers. Sauerbrunn, in U.S. Pat. No. 4,299,498 (1981), teaches that the formation of a polymer aerosol is undesirable because the relative viscosity of the polymer product is reduced and polymer deposits build up throughout the vent system. Sauerbrunn also teaches that so-called "flashing reactors" or "flashers" such as those described by Heckert or Iwasyk et al. (cited hereinabove) cannot be successfully operated at high capacities because of polymer gelation, decreased polymer viscosity and possible aerosol formation. Therefore, the prior art teaches that the formation of an aerosol or polymer entrained in a vapor phase should be avoided in the continuous production of a polycondensate.

In contrast to the teachings in the prior art, we have found that it is critical that the velocity of the reaction mixture passing through the reaction zone is sufficient to maintain a turbulent flow of dispersed particles in a continuous vapor phase in the reaction zone. This turbulent flow through the reaction zone causes the system to be essentially self-purging. The polycondensate phase is dispersed in the vapor phase and the polycondensate is not deposited on the reactor wall for sufficient time for significant degradation of the polycondensate to occur. The high velocity also provides for an average residence time for the reaction mixture that is less than that of the prior art processes. The instant process provides a shorter residence time for the reaction mixture in both the reactor section and the complete process. Consequently, higher mean reaction temperatures can be achieved in this system than those of the prior art processes. Additionally, since the reaction mixture is substantially dispersed as particles in a vapor phase or, if deposited on the reactor walls, is rapidly swept from the walls by the high velocity in the reaction zone, there is consequently a high surface-to-volume ratio of condensate in the high-temperature region. This allows the condensation reaction to proceed with a minimum of transport limitations even at high conversions and short residence times.

Since polycondensation reactions are equilibrium controlled reactions, a decrease in pressure can cause some polymerization to occur. Our experimental results show that in the formation of a polyamide, venting the reaction mixture from the salt reactor into a chilled receptacle provides a product with a number average molecular weight of 584. This corresponds to a degree of polymerization ($\overline{DP}$) of 4.79 and an extent of reaction ($\overline{X}$) of 0.791 as shown in Example 20. Clemo et al. teach that under the conditions in the reactant mixing vessel, the $\overline{DP}$ is between 1 and 2. Therefore, while the flashing step alone has provided a slight increase in the extent of polymerization, it is not significant. By way of comparison, when this reaction mixture was passed through the reaction zone of the instant invention, the number average molecular weight of the product from the reaction zone was 1440 which corresponds to a $\overline{DP}$ of 11.8 and an $\overline{X}$ of 0.915.

The increase in the degree of polymerization provided by the instant process allows a much smaller finishing reactor to be used (if a finishing reactor is needed). Since the cost of finishing reactors such as extruders is high, significant savings can be realized in equipment by using the instant process. Alternatively, higher throughput can be obtained for a given extruder when the instant process is used.

The term "prepolymer" is used herein to refer to the salt or adduct which is formed when the monomers are combined and heated under pressure in the preheat zone.

The term "polycondensate" is used herein to refer to the polymeric product which is formed after the reaction mixture is flashed and as it passes through the reaction zone in the instant process.

The term "extent of reaction", $\overline{X}$, is defined herein to mean the fraction of the functional or end groups that has reacted at a particular time. As used herein, the term "conversion" refers to the extent of reaction expressed as a percentage. The "average degree of polymerization", $\overline{DP}$, is related to the extent of reaction by the relationship, $\overline{DP}=1/(1-\overline{X})$. For example, in the formation of a common polyamide, the combination of a diacid monomer and a diamine monomer to form one amide linkage would provide an extent of reaction, $\overline{X}$, of 0.5 and an average degree of polymerization, $\overline{DP}$, of 2. When three monomer molecules are joined together through two amide bonds, $\overline{X}$ is 0.67 and $\overline{DP}$ is 3.

G. B. Wallis, in his book *One Dimensional, Two-Phase Flow* (McGraw-Hill, 1969), defines four distinct flow regimes in the flow of vapor-liquid two-phase systems. These are bubbly flow, slug flow, annular flow and drop flow. These types of flow are represented in FIG. 1.

Figure 1A:
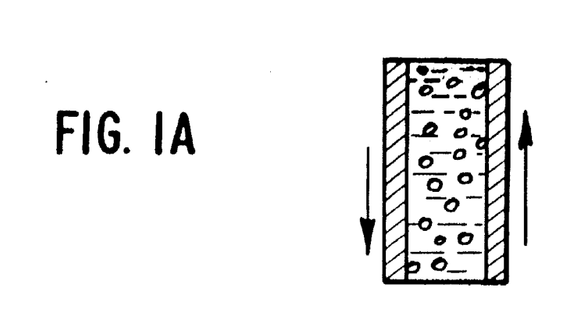
FIG. 1A, 1B, 1C and 1D each a representation of two-phase flow regimes.
Figure 1B:
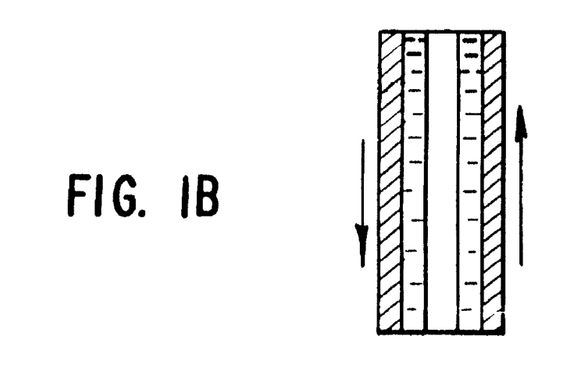

As defined by Wallis and as used herein, the term "annular-flow regime" is defined to be the flow of a continuous liquid film along the walls of a conduit with either cocurrent or countercurrent flow of vapor in the central core. This is represented in FIG. 1B.

Figure 1C:
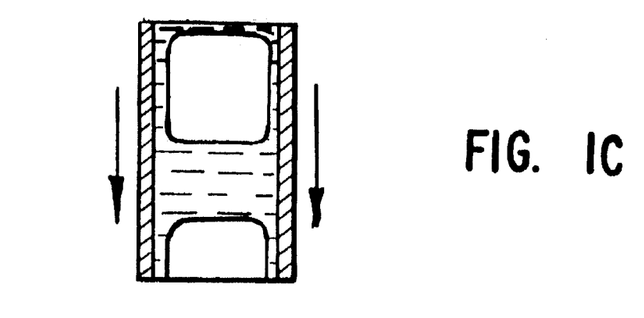
Figure 1D:
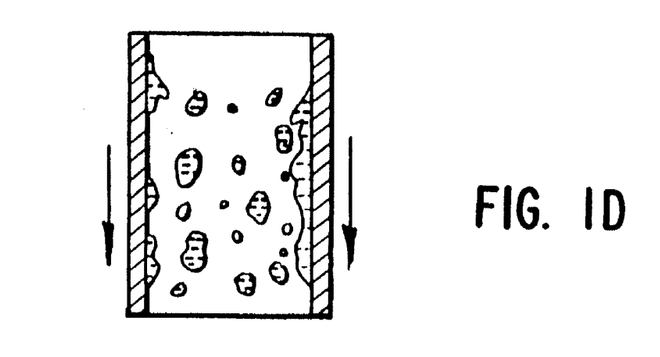

The terms "dispersion", "drop-flow regime", "aerosol" and "aerosol mist" are used interchangeably herein to mean a flow in which particles of condensate and reactants are dispersed in a continuous vapor phase; and, although some material can be present on the reactor walls, it is only present as a discontinuous layer since vapor flow is sufficient to rapidly sweep it from the walls and redisperse it in the vapor phase. Such a flow is represented in FIG. 1D. While the dispersed particles would ordinarily be in the form of a liquid, the instant process can also be used for solid particles, provided the particles are small enough in size to avoid plugging the instant orifices. It is this "aerosol" formation that Sauerbrunn (cited hereinabove) teaches should be avoided.

"Bubbly flow" is defined by Wallis and used herein to mean a flow pattern characterized by a suspension of discrete bubbles of vapor in a continuous liquid phase. This is represented by FIG. 1A. The flow regime in which bubbles are so large that they assume a cylindrical shape and almost fill the conduit in which they are flowing is referred to herein as "slug flow" and is depicted in FIG. 1C.

In the prior art systems for polycondensation reactions in tubular reactors, bubbly flow is obtained in some systems with very low reaction rates and annular flow is used in the remainder. The prior art teaches that flow rates should prefer, ably be less than those required for slug flow because of the inherent instability of such flow. As disclosed by Iwasyk, cited hereinabove, a two-phase annular flow is preferred. Drop flow has only been achieved briefly in some systems as the incidental result of flashing as a method of pressure reduction. In contrast, the process of the instant invention is operated at flow rates greater than slug flow and there are operational difficulties if the flow rate in the reactor decreases to where slug flow commences.

It is essential in the practice of the instant invention to maintain the velocity of the vapor in the reactor above a critical minimum rate. This is the "critical velocity" necessary to maintain the flow in the drop-flow regime. This critical velocity ($V_c$) has been defined by Wallis with the following equation taken from page 390 of his book:

$$V_c = \frac{2.4 \times 10^{-4} \sigma}{\mu g \left(\frac{\rho g}{\rho l}\right)^{1/2}}$$

where σ is surface tension,
ρ is density,
μ is viscosity,
g is gas, and
l is liquid.

According to Wallis, as the vapor velocity is decreased to less than the critical velocity, $V_c$, the drop flow is transformed to annular or slug flow, other things being equal.

In practice, it is difficult to calculate the critical velocity, $V_c$, directly since the values of many of the parameters cannot be readily measured at polycondensation conditions. A good approximation of these parameters can be made using model compounds and using estimated physical properties. It has been found that reasonable values can be obtained using model compounds which are adducts of the monomers. For example, an amino-acid species with a single internal amide linkage can be utilized as the model for polyamides. The results obtained with this model have been found to be more acceptable than those obtained using higher oligomers as models.

The estimation procedures, which are well known to those skilled in the art, can be found in *Perry's Chemical Engineer's Handbook* (4th Edition, McGraw-Hill, 1963), and *The Properties of Gases and Liquids* by Reid, Prousnitz, and Sherwood (3rd Edition, McGraw-Hill, 1977). Surface tensions can be predicted using the MacLeod-Sugden correlation. Viscosities can be estimated using Morris's method. Critical temperatures and pressures can be determined using Lydersen's method. The Messinet method can be used to estimate the boiling point of the model compound, and the Edminster equation is useful in projecting an acentric factor.

The calculated $V_c$ of this equation is the lowest velocity possible to establish drop flow. At this critical velocity there can be insufficient material entrained, i.e., dispersed, as droplets to achieve stable drop flow. Also, since the outlet velocity represents the maximum flow rate in the reactor, setting the outlet velocity at the calculated critical velocity can provide flow rates below the critical velocity at other points in the reactor. It has been determined experimentally that smooth operation of the instant process is achieved and maintained if the outlet velocity from the reactor is maintained above the calculated critical velocity, other things being equal. In operation, as the flow rate out of the reactor is reduced so as to approach $V_c$, the flow exiting the reactor becomes unstable and there is a deterioration in product properties such as color.

The minimum velocity, $V_{min}$, is defined herein as the calculated velocity of the vapor phase in the reactor assuming all of a volatile component (commonly the solvent) is vaporized and including any volatile by-product formed as the result of flashing the reaction mixture. The amount of by-product which is included is calculated using equilibrium calculations and/or experimental determinations of the extent of reaction which occurs upon flashing. Once the amount of volatile component is determined, the minimum velocity can be calculated using ideal gas assumptions to estimate the volumetric flows based upon molar flow rates and the internal dimensions of the reactor. These methods are well known to those skilled in the art.

In the practice of the instant process, it has been found that the minimum velocity, $V_{min}$, should be greater than the critical velocity, $V_c$. Preferably, the minimum velocity should be at least 1.1 times the critical velocity and most preferably at least 1.2 times the critical velocity.

In the practice of the instant process, it has been found to be more convenient to control the specific mass flux in the reactor than to calculate velocities. As used herein, the terms "specific mass flux" and "specific mass flow rate" are used interchangeably and mean the total mass flow per unit time per unit flow area and are ordinarily designated herein as pounds (or kilograms) per hour per square inch. The lower limit of specific mass flow is that which will maintain the flow in a turbulent or drop-flow regime and not allow the flow to degrade (or decrease) to an annular-flow regime. The upper limit of the specific mass flow rate is determined by the limits of heat input. There must be sufficient heat transfer between the surface of the heat exchange medium and the reaction mixture to maintain the mean temperature of the reaction mixture at the desired level in the reactor.

Generally, the instant process can be described as follows. The starting materials for the polycondensation reaction are combined to form an essentially homogeneous mixture. Preferably, this mixture is a single liquid phase, although it is contemplated that the mixture can consist, for example, of a dispersion of solid particles in a liquid phase. Any such mixture must be such as to not interfere with passage of the mixture through an orifice to form a dispersion. Ordinarily, the mixture is formed by mixing the reactants in a solvent and heating under pressure in order to dissolve the reactants or their adducts. This mixture should be maintained at the lowest temperature and pressure necessary to achieve the essentially homogeneous mixture.

The homogeneous mixture is then transferred, commonly by a pumping means, to a preheat or preflash zone. In the preheat zone, the temperature of the homogeneous mixture is increased to a temperature no greater than the lower of the decomposition of the starting material mixture or the polymer being formed. The pressure in the preflash zone is kept at a level sufficient to maintain a homogeneous or single-phase system. The residence time of the reaction mixture in the preflash zone should be the minimum necessary to allow the mixture to attain the desired temperature. In the instant process, the preflash zone is ordinarily a heat-traced line leading from the mixing zone to the orifice of the reaction zone.

The mixture from the preflash zone is passed through an orifice into a region or zone of lower pressure. The purpose of the orifice is to maintain the pressure differential between the preflash zone and the zone of lower pressure, i.e. the flash zone. There must be sufficient pressure differential between the preflash zone and the flash zone to substantially vaporize a volatile component in the mixture and "atomize" the mixture to establish a dispersion or spray of particles or drops in a vapor phase. Optionally, additional volatile component or different volatile components can be added. During normal operation, it is necessary to establish a drop-flow regime in this zone. Heat is introduced to minimize the cooling effect of the flashing step. It is desirable that the mean temperature of the mixture entering the orifice be as high as possible but still below the degradation temperature (of the starting material mixture or the polymer being formed) in order to maximize the conversion which will take place in the flashing step and also to minimize the effect of the cooling which occurs during the vaporization of the volatile component.

Surprisingly, it has been found that by maintaining the velocity of the reaction mixture through the reaction zone at a sufficiently high rate to maintain a highly turbulent flow, i.e., a drop-flow regime, unexpectedly high conversions can be obtained at very short residence times. We have found that it is necessary to have a specific mass flow rate greater than about 60 pounds per hour per square inch and preferably a specific mass flow rate greater than about 100 pounds per hour per square inch. When the specific mass flow rate is less than about 60 pounds per hour per square inch, there are significant flow problems at the exit of the reaction zone as evidenced by the formation of a liquid pool and surging or slug flow. Such flow difficulties can result in poor polymer properties and the formation of gels.

Heat must be introduced into the reaction zone to increase the mean temperature of the reaction mixture to a level sufficient to provide at least a 10 percent increase in conversion compared to that in the preflash zone. Preferably, the increase in conversion is at least 25 percent and most preferably at least 50 percent. Ordinarily, the condensation reaction is at least 80 percent complete, i.e., the extent of reaction is at least about 0.8, when the reaction mixture exits the reactor. This energy is ordinarily provided by heating the walls of the reactor to provide a heat exchange surface when the reaction mixture contacts the walls. As stated hereinabove, sufficient velocity of the materials through the reaction zone must be maintained to provide sufficient turbulence that the contact time of the reaction mixture with the reactor walls is too short to allow polymer degradation or polymer buildup.

The temperature differential between the heat exchange surface and the reaction mixture depends upon the temperature of the material in the preflash zone and the specific mass flow rate through the reaction zone. Other things being equal, a higher differential must be maintained when the preflash zone temperature is low and when the specific mass flow rate is high. The temperature of the heat exchange surface, however, must be controlled so that the maximum bulk temperature of the reaction mixture does not exceed the polymer degradation temperature; otherwise, a deterioration of polymer properties can occur.

The pressure drop through the reaction zone is ordinarily controlled by throttling the rate at which the reaction mixture exits the reaction zone. In proper operation, the drop-flow regime should be maintained as the reaction mixture exits the reaction zone. It is not desirable to have surging or slug flow at this point. It is ordinarily preferred that there be some pressure drop as the reaction mixture exits the reaction zone; although, depending on other conditions in the reaction zone, it is possible to operate with zero pressure drop. Commonly, this pressure drop can range from about 0 to about 400 psig (pounds per square inch-gauge).

As stated hereinabove, an important feature of the instant process is the low average residence time of the reaction mixture in the reactor. Ordinarily, this average residence time is less than one minute and preferably is less than forty-five seconds, most preferably less than twenty seconds. Such a low residence time allows the instant process to be operated at a much higher mean temperature than is possible in the prior art processes which have a much longer average residence time. To avoid polymer degradation, processes using a long reactor residence time must operate at a lower mean temperature.

It has been found that the mean temperature of the reaction mixture is the most important variable in controlling the extent of reaction in the reaction zone. Factors such as residence time, reactor pressure, and preheat conditions have not been found to have significant effects on product inherent viscosity, i.e., molecular weight. The extent of reaction and the number average molecular weight of the polymer product have been found to correlate more closely with the mean temperature of the reaction mixture than to any of these other variables. Thus, the higher mean temperature of the instant process, compared to that of prior art processes, provides for a higher molecular weight product at a shorter mean residence time.

The mean temperature of the reaction mixture in the reaction zone is commonly measured with at least one temperature sensing device, such as a thermocouple, located in the reaction zone. Since under the conditions of polymerization many of the polymers prepared are molten, this mean temperature is also referred to herein as the "melt temperature".

Experimental results have shown that temperature of the reaction mixture about one-quarter of the distance through the reaction zone provides a convenient monitor of the polymerization process. Changes in the observed temperature at this point are the result of the combined effects of changes in the volatile content of the reaction mixture and the feed rate of material into the reaction zone.

Figures 2, 3B:
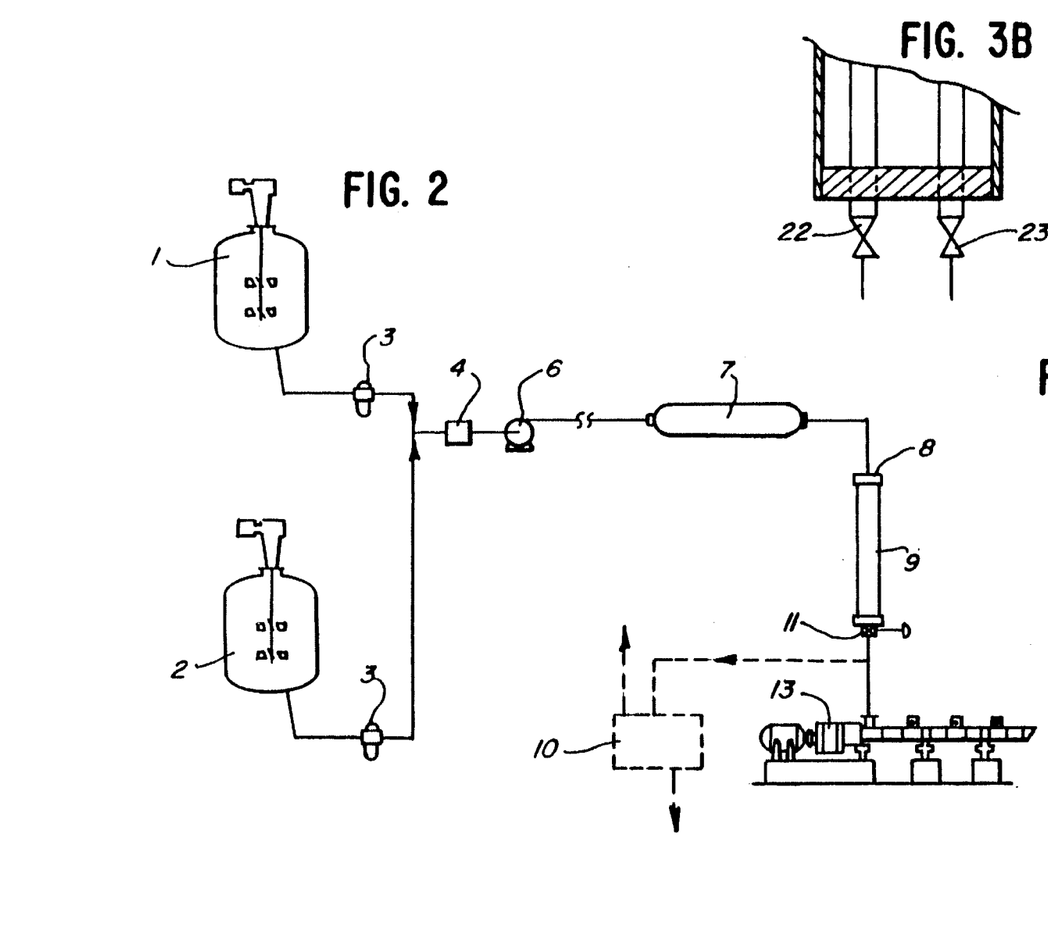

The apparatus useful in the practice of the instant process is schematically represented in FIG. 2. Vessels 1 and 2 are stirred tanks which can be heated and pressurized. In batch operation, monomers are combined in each vessel to form a feed mixture which comprises an adduct, prepolymer or salt. The contents of each vessel are transferred sequentially to the reactor 9. During usual operation, one vessel 1 is refilled with monomers while the feed mixture from the other vessel 2 is being transferred to the reactor. Continuous flow to the reactor is maintained by the use of multiple batch mixing vessels (2 or more can be utilized). The batch mixing vessel allows close control of feed stoichiometry which is critical in condensation polymerizations. However, it is contemplated in the instant invention that, if desired, monomers can be combined on a continuous basis provided effective control means are incorporated into the system to give proper stoichiometry and minimize solids formation.

After the feed mixture is removed from a mixing vessel, such as 1, it is preferably passed through a filter means 3 to remove any solid particles. This is to avoid any plugging in feed lines or orifices and to maintain proper stoichiometry in the reactor. However, in the event that solid particles are used in the reaction, this filter can be eliminated or be of such a sieve size as to trap only those particles which would interfere with the operation of the process. The flow of feed mixture is controlled by a flow controller means 4, although pumping means 6 can be used to control the flow or can be coupled with flow control means 4 to maintain the proper flow. Preferably, pumping means 6 can be one or more positive displacement pumps which are used to maintain and control flow from vessels 1 and 2.

The pumping means 6 is used to increase system pressure to a level sufficient to prevent flashing of volatile components in the feed mixture in preheater 7. The preheater 7 can be any means for increasing the temperature of the feed mixture to the desired level while the mixture is under sufficient pressure to avoid vaporization of volatiles. Optionally, a pressure-rated heat exchanger or multiple heat exchangers can be utilized. Preferably, the residence time of the feed mixture at the desired elevated temperature is minimized to maximize through-put and minimize degradation problems. It has been found most effective to simply utilize a heat-traced transfer line as the preheater. All of the transfer lines from the vessels 1 and 2 are temperature-controlled to maintain the temperature of the feed mixture substantially the same as that in said vessels. A portion of the transfer line ordinarily between the pumping means 6 and the reactor 9, also referred to herein as the "flash reactor" is heat-traced to allow the temperature of the feed mixture to be increased to the desired level. The length of this high temperature portion of transfer line depends on the desired temperature of the feed mixture, the diameter of the transfer line and the throughput of the feed mixture. Other things being equal, the length must be longer if the temperature is higher, the diameter of the line is greater or the throughput is greater. The minimum length can be readily calculated or determined without undue experimentation.

The heated, pressurized feed mixture passes from the preheater 7 through an orifice 8 which is located between the preheater 7 and the reactor 9. The orifice is sized to allow a stream of feed mixture to pass therethrough while maintaining the pressure of the feed mixture in the preheater 7 and allowing volatile components in the feed mixture to flash into the lower pressure region in the reactor 9. The orifice 8 can be any opening sized to provide the above-described function. The optimum size of orifice 8 depends on the viscosity of the feed and the flow rate. If a single feed mixture is processed on a continuous basis, it is advantageous to use a fixed orifice of optimum size. However, if the composition of the feed mixture or throughput is varied, it can be advantageous to use an adjustable orifice, such as a valve.

As discussed hereinabove, as the feed mixture passes through the orifice into the reactor 9, volatile components in the feed mixture rapidly vaporize in the lower pressure zone in the reactor. This rapid vaporization or flashing forms a spray of particles or drops dispersed in a vapor phase. This flashing process also results in substantial cooling of the dispersion. Consequently, reactor 9 is designed to provide a high heat flux to the dispersion and rapidly reheat the reaction mixture to promote the condensation reaction. The design of the reactor must be such that turbulent flow of the dispersion is maintained throughout the reactor. Additionally, the residence time of the reaction mixture in reactor 9 is short, preferably less than about 60 seconds, most preferably about 0.1 to about 20 seconds.

A design for reactor 9 which has been found to be particularly successful is that of a tubular reactor. This configuration is simple yet provides the required heat flux to the reaction mixture. The length can be adjusted depending on the residence time desired at a given throughput. The diameter of the reactor can be adjusted to affect the heat flux into the reaction mixture. The length-to-diameter ratio can be adjusted to provide the desired control of residence time, heat flux and reaction mixture velocity in the reactor.

In ordinary operation, it is preferred that the reactor 9 be about 2 to about 40 feet long with an internal diameter of about 0.1 to about 12 inches. More preferably, the length is about 6 to about 20 feet and the internal diameter is about 0.3 to about 1.0 inches.

After passing through reactor 9, the reaction mixture exits the reactor through exit port or outlet 11. Exit port 11 is used to control the pressure in reactor 9. Control of exit port 11 in conjunction with the inlet pressure to orifice 8 and the throughput will determine the velocity of the reaction mixture through reactor 9. Any means suitable for maintaining pressure in a heated system can be used as exit port 11. In order to adjust the pressure drop in reactor 9, it is preferred that exit port 11 be adjustable and, conveniently, a control valve is used.

The reaction stream which passes through exit port 11 can be collected in a collection vessel 10 with the polymer product being recovered and utilized as such or, more preferably, converted to higher molecular weight material in a further polymerization step. More preferably, the reaction stream is passed through exit port 11 directly into a post-polymerizing apparatus 13. The post-polymerizing or finishing apparatus 13 can be any apparatus capable of processing materials with a broad range of viscosities and of generating a high surface-to-volume ratio in said material. Various types of finishing reactors can suitably be employed, for example, extruders, disk ring reactors, agitated stranding devolatilizers, and thin film evaporators. Preferably, a twin-screw extruder is utilized with the polymer from the reaction zone injected directly onto its screws. Residence time in the twin-screw extruder is ordinarily about 45 seconds to about 20 minutes.

Figure 3A:
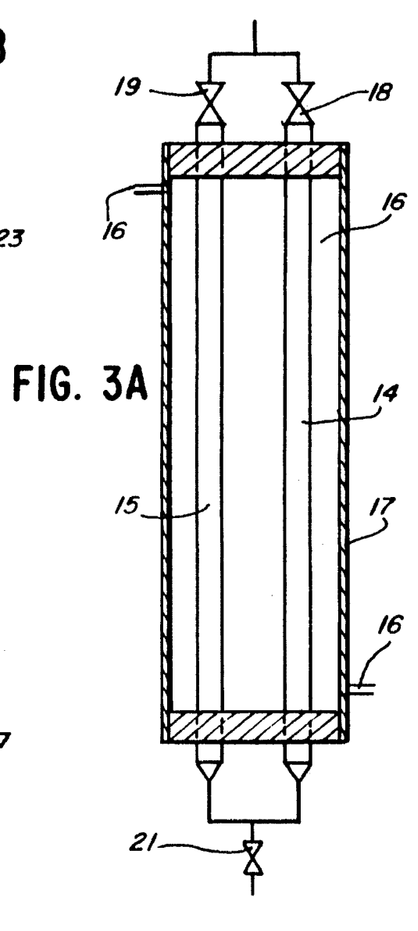
FIG. 3A, and B, schematics of a multiple tube reactor with FIG. 3A showing a single outlet valve and FIG. 3B showing multiple outlet valves.

To increase throughput, multiple reactors can be used. For ease of control it is preferred that all reactors be of the same size. However, it is possible to use a combination of different sized reactors and blend the product from each, if desired. A preferred embodiment is shown in FIG. 3A. In this configuration, two tube reactors 14 and 15 are oriented side-by-side in parallel surrounded by a single heat-exchange medium 16 within a container vessel 17. Orifices 18 and 19 are controlled in conjunction with outlet valve 21 to provide similar throughputs through the reactors 14 and 15. It is contemplated that multiple outlet valves can be used for the multiple reactors, i.e., an outlet valve 22 and 23 for each reactor as shown in FIG. 3B. It has been found that a single outlet valve is preferred. The throughputs are balanced by substantially matching the temperature profiles through the length of each reactor. It is contemplated that a plurality of reactor tubes can be installed in parallel. The number in each container vessel 17 would be determined only by heat-exchange limitations and the difficulty in balancing the flows through a large number of tubes. In a commercial plant, a plurality of container vessels, each containing one or more reactors, can be used in parallel to provide the desired capacity.

Methods commonly used to provide heat to a liquid and to a vapor/liquid mixture can be utilized in the present system, for example, radio-frequency inductive heating, microwave, electrical resistance, etc. Preferably, a heat exchange medium such as high pressure steam or an oil is employed. It is preferred that the various pieces of apparatus in the system be jacketed as necessary so that the heat-exchange medium can be efficiently circulated to provide the required heat flux. There can be separate heating systems utilized to provide heat-exchange mediums or different temperatures as required, or throttling means can be employed for each jacketed piece of apparatus coupled with a temperature control means so that a controlled amount of heat-exchange medium is circulated to the apparatus.

It is also possible to inject a heat carrier into the reactor 9. The heat carrier should be inert under the reaction conditions. The carrier can be injected at any location in the system after pump 6 or through the length of reactor 9 as required for efficient operation. Additionally, this carrier can be used to increase the specific mass flow rate in the reactor and provide the necessary drop-flow conditions. This carrier would ordinarily be employed if the rate feed mixture added to the reactor were insufficient to maintain drop-flow conditions or if the reactor design provided insufficient heat flux to the reaction mixture. Examples of such carriers which can be used are nitrogen, water, etc.

Ordinarily, in the preparation of polymers such as polyesters, polycarbonates, polyarylates and polyestercarbonates by the instant process, a prepolymer is prepared by mixing the starting materials or reactants. These prepolymers can be dissolved in a suitable solvent either during or after formation. The solution is transferred to the preheat zone and then to the reaction zone.

The instant process is particularly well suited for the formation of polyamides, polyamide-imides, and polyimides. Commonly, in the production of these polymers, the appropriate aliphatic or aromatic diamine is combined with di-, tri-, or tetracarboxylic acids, or the anhydrides thereof, or mixtures of the various acids or anhydrides. The diamines are combined with the acids or anhydrides to form a mixture of reactants. This mixture of reactants is normally composed of principally an ammonium carboxylate salt; however, the mixture can also contain free diamine, free acid and free acid anhydride as well as condensation products having amide, amic acid, and imide linkages. For convenience, this mixture of reactants will be referred to herein as a "salt".

The salt formation is carried out by charging feed materials into any suitably designed stirred reactor at an elevated temperature ordinarily about 75° F. to about 175° F. A suitable solvent is used to dissolve the salt and form a solution which preferably contains less than about 25 percent by weight solvent although more dilute salt solutions can be used in the instant process. Other things being equal, the more dilute the solution, the lower the polymer production which is attained per unit time and the lower the specific mass flow rate which is necessary to maintain drop-flow conditions. It is also possible to prepare a dilute solution of the reactants and concentrate it by for example distillation to remove solvent, prior to passing it into the reaction zone.

Solvents which can be suitable for dissolving the prepolymers and salts as described hereinabove include, for example, hexafluoroisopropanol, water, methanol, ethanol, or other alkanols; phenol, cresols, hisphenol A, or other phenolic compounds; formic acid, acetic acid, or other alkanoic acids; dimethylformamide, dimethylacetamide, and N-methyl pyrrolidone dichloromethane dichlorodifluoromethane, dichloroethane, or other halocarbons.

In the formation of a typical polyamide, the salt solution is heated to provide a homogeneous solution ordinarily in a range of about 375° F. to about 450° F. The pressure is maintained at a level sufficient to have a homogeneous single-phase solution. This homogeneous salt solution is then metered through a pump, and pressure is increased commonly to the range of about 1,000 psig to about 3,000 psig. If additional processing is required to purify or filter the salt solution, that operation is preferably carried out prior to the solution entering the pump. Under such conditions, there can be a small amount of condensation taking place to form some prepolymer. The resulting salt-prepolymer mixture is then heated in the preflash zone to a temperature of between about 400° F. and about 650° F., preferably between about 550° F. and 650° F., and flashed through a control valve or nozzle to provide a dispersion of the salt and prepolymer mixture in a vapor phase.

The resulting vaporization of a volatile component provides the desired dispersion in the flash zone. Ordinarily, the pressure in the flash zone is about 0 to about 400 psig. This dispersion of the salt and prepolymer mixture in a vapor phase passes into the reaction zone which provides a high heat flux to the reaction mixture. Ordinarily, the temperature of the heat exchange surface is about 600° F. to about 1,000° F. The corresponding mean temperature of the dispersion is about 500° F. to about 750° F. through the reaction zone as measured by thermocouples inserted into the reaction zone. The total residence time of the reaction mixture in the reaction zone is about 0.1 to about 20 seconds, preferably about 0.2 to about 10 seconds, and varies with the specific mass flow rate and pressure which are suitably in the range of about 100 pounds per hour per square inch to about 400 pounds per hour persquare inch and about 0 to about 400 psig, respectively.

Suitable dicarboxylic acids useful in our process to manufacture polyamides include terephthalic acid, isophthalic acid, 5-tertiary-butylisophthalic acid, adipic acid, azelaic acid, sebacic acid, dodecanedioic acid, bussylic acid, etc. The preferred acids are terephthalic acid, isophthalic acid and adipic acid and mixtures of these. Polyamides can also be prepared from aminocarboxylic acids, their zwitterionic salts, lactams, amido acids and other derivatives of amino acids. Examples of suitable amino acids include: p-aminobenzoic acid; m-aminobenzoic acid; 4-(aminomethyl) benzoic acid; 3-aminomethyl) benzoic acid; 6-aminohexanoic acid; caprolactam; pivalolactam; 2-aminobutyric acid; 6-formamido hexanoic acid; 11-aminoundecanoic acid; 11-isocyanotoundecanoic acid; 12-aminodedecanoic acid; aminomethyldimethylacetic acid; 4-aminobiphenyl-4'-carboxylic acid; 4-aminoterphenyl-4'-carboxylic acid; 4-aminodiphenylether-4'-carboxylic acid; 3-aminodiphenylether-4'-carboxylic acid; and aminonaphthanoic acids.

The amino acids are suitable for self-condensation or as components of a copolymer.

Polyesteramides can be prepared from, for example, caprolactam and p-(hydroxymethyl) benzoic acid.

Examples of suitable acid-anhydrides and dianhydrides useful in our process include trimellitic anhydride, pyromellitic dianhydrides, 2,3,6,7-naphthalene tetracarboxylic dianhydride; 3,3',4,4'-diphenyl tetracarboxylic dianhydride; 1,2,5,6-naphthalene tetracarboxylic dianhydride; 1,2,3,4-cyclopentane tetracarboxylic dianhydride; 2,2',3,3'-diphenyl tetracarboxylic dianhydride; 2,2-bis(3,4-dicarboxylphenyl) propane dianhydride; 3,4-dicarboxylphenol sulfone dianhydride; 3,4,9,10-perylene tetracarboxylic dianhydride; 2,3,4,5-pyrrolidone tetracarboxylic dianhydride; bis(3,4-dicarboxylphenyl) ether dianhydride; ethylene tetracarboxylic dianhydride; 3,3',4,4'-benzophenone tetracarboxylic dianhydride; bis(3,4-dicarboxylphenyl) sulfide dianhydride; bis(3,4-dicarboxylphenyl) methane dianhydride; 1,4,5,8-naphthalene tetracarboxylic dianhydride; etc. The preferred dianhydrides are trimellitic anhydride, tricarboxylic acids and their corresponding anhydrides. It should be understood that tricarboxylic acids and their corresponding anhydrides, like trimellitic anhydride, are useful for the manufacture of polyamide-imides, and tetracarboxylic acids and their corresponding anhydrides are useful for the manufacture of polyimides.

Aliphatic, cycloaliphatic and aromatic diamines useful in our process include the following: hexamethylene diamines, trimethylhexamethylene diamine, ethylenediamine, tetramethylene diamine, octamethylene diamine, nonamethylene diamine, decamethylene diamine, dodecamethylene diamine, 4,4'-diamino (dicyclohexylmethane), diaminocyclohexanes, bis-(aminomethyl)-cyclohexanes, and xylene diamine. The preferred aliphatic diamines include hexamethylene diamine and trimethylhexamethylene diamines. In addition to free diamines, incipient or protected diamines such as diisocyanates, formamides, and aceramides may be used. The condensation reaction proceeds by displacement of the protecting moiety. Once displaced, the protecting moiety should be a vapor under the conditions employed in reactor 9. Corresponding aromatic compounds can also be used.

Suitable aromatic diamines useful in our process include para- and metaphenylenediamine; para- and metaxylenediamine; paratoluenediamine; 2,4-toluenediamine; 2,6-toluenediamine; 3,5-toluenediamine; oxybis(aniline); thiobis-(aniline); sulfonylbis-(aniline); diaminobenzophenone; methylenebis-(aniline); benzidine; 1,5-diaminonaphthalene; oxybis-(2-methylaniline); thiobis-(2-methylaniline); and the like. Examples of other useful aromatic primary diamines are the following: 2'2'-naphthalene diamine; 2,4'-naphthalene diamine; 2,2'-biphenylene diamine; 3,3'-biphenylene diamine; 4,4'-biphenylene diamine; and the like; 3,3-dichlorobenzidine; ethylene dianiline-( 4,4'-diaminodiphenylethane); and the like; ketodianiline; 3,3'-diaminodiphenyl sulfide; 4,4'-diaminodiphenyl sulfone; 3,3'-diaminodiphenyl sulfone; hexafluoroisopropylidene-bis( 4-phenyl amine); 4,4'-diaminodiphenyl methane; 2,6-diaminopyridine; bis-(4-aminophenyl)-diethyl silane; bis-(4-aminophenyl) ethyl phosphone oxide; bis-(4-aminophenyl)-N-phenylamine; bis-(4-aminophenyl)-N-methylamine; 3,3'-dimethyl-4,4'-diaminobiphenyl para-bis(2-methyl-4-aminophenyl)-benzene, and 3,3'-diaminoadamantane. The preferred aromatic diamine is meta-phenylenediamine.

A preferred process comprises preparing a salt of an aliphatic or aromatic diamine or a mixture of these and di-, tri- or tetracarboxylic acid, a mixture of these or their corresponding anhydrides by reacting both feed-stocks at a temperature of about 375° F. to about 450° F. in an aqueous medium. Best results have been obtained when the water content of the resulting solution was kept below 25 percent water by weight. The resulting salt solution is subjected to a pressure of about 1500 to about 3000 psig and is then passed through a preflash zone where the temperature is increased from about 425° F. to about 625° F. The total residence time is about 25 to about 50 seconds. The reactants then are flashed through a control valve or nozzle to give a dispersion at a pressure of about 0 psig to about 400 psig and dispersion temperatures of about 500° F. to about 750° F. The total residence time in the reactor is about 0.1 to about 20 seconds. The polymer is then injected onto the screws of a twin-screw reactor. The residence time in the extruder is about 45 seconds to about 3 minutes.

Preferred polymers manufactured by our process are the polyamides prepared from hexamethylene diamine, terephthalic acid, isophthalic acid and adipic acid in the mole ratio of about 100:65:35:10 to about 100:90:5:5. The polyamides which are prepared from hexamethylene diamine, terephthalic acid and isophthalic acid are in the mole ratio of about 100:0:100 to about 100:90:10, preferably 100:65:35 to 100:85:15.

These polyamides, polyamide-imides and polyimides prepared by the novel process described herein are used as replacements for metals in engineering applications and, therefore, they are molded and usually filled with reinforcing materials. For other applications, fibers and laminates also are prepared from the polymers manufactured using our novel process.

When utilizing our process to prepare polyesters from dicarboxylic acids and glycols, polycarbonates from diphenols and phosgene, polyarylates from diphenols and dicarboxylic acids and polyestercarbonates from diphenols, dicarboxylic acids and phosgenes, we prepare a prepolymer which suitably can be an oligomer, dimer or trimer. This prepolymer should be essentially homogeneous and in a single phase, be stable under the high reaction temperatures, and be capable of atomizing readily at the inlet of the jet or flash reactor. The temperatures and other reaction conditions are the same as set forth hereinabove.

Suitable polyesters which are prepared by our process are disclosed by Kirk-Othmer *Encyclopedia of Chemical Technology*, John Wiley and Sons (1982), 3rd Edition, Vol. 18, pages 531–576, and the *Encyclopedia of Polymer Science and Technology*, John Wiley & Sons (1969), Vol. 11, pages 62–128, including the references cited therein. All the pages and the references cited therein from the article in Kirk-Othmer are incorporated into this application and made part hereof. Suitable polycarbonates which are prepared by our process are disclosed in the aforementioned Kirk-Othmer *Encyclopedia of Chemical Technology*, Vol. 18, pages 479 through 494, including the references cited in the Kirk-Othmer article and in Chapter 2 of the Lee et al. book. Suitable polyarylates prepared by our process are disclosed in U.S. Pat. Nos. 3,772,389 and 4,302,382 and the references cited therein. Both patents and the references cited therein are incorporated by reference into this application and made part hereof.

Suitable polyesters which are prepared by our process include poly(ethylene terephthalate), (PET); poly(ethylene isophthalate); poly(ethylene phthalate); poly( 1,2-propylene terephthalate); poly(1,3-propylene terephthalate); poly(2,2-dimethyl-1,3-propylene terephthalate); poly(butylene terephthalate), (PBT); poly(ethylene naphthalene-2,6-dicarboxylate), (PEN); poly(ethylene diphenyldicarboxylate); poly(ethylene-1,2',6,6'-tetramethyldiphenyl- 4,4'-dicarboxylate); poly(1,4-cyclohexylbismethylene terephthalate-co-isophthalate); poly(methylene bisphenylcyclohexyl-1,4-dicarboxylate); and poly(1,3-cyclohexyl bismethylene cyclohexyl-1,3-dicarboxylate.

In addition, other combinations and mixtures of the aforementioned ingredients can also be used. Moreover, the bisphenols mentioned hereinbelow are also suitable monomers for polyesters or polyarylates. Additional suitable monomers include oligomeric and polymeric ethylene glycols, propylene glycols and tetramethylene glycols, as well as aliphatic dicarboxylic acids such as 2,2-dimethyl propane-1,3-dicarboxylic acid, butanedioac acid and adipic acid. The dihydroxy monomer can be present as the free diol or protected by an acetate, other ester or suitable protecting group. Similarly, in the initial polymerization mixture, the diacid monomer can be present as the free diacid or suitably protected by an ester group such as methyl, ethyl, phenyl or other esters. In addition, hydroxy acids and derivatives such as lactones, and hydroxy ester can be used either as ingredients on copolymer formulations or as monomers for homopolymers. Examples of suitable monomers include 2-hydroxybutyric acid; 4-(hydroxymethyl)-benzoic acid; methyl-4-(hydroxymethyl) benzoate; 2,2'-dimethylpropiolactone, that is pivalolactone; 3-(hydroxymethyl) benzoic acid; (hydroxyethyl) benzoic acid; hydroxyphenylacetic acid; ethylhydroxyphenyl acetate; 4-hydroxybenzoic acid; 4-acetoxybenzoic acid; methyl-3-hydroxybenzoate; caprolactone; 6-hydroxyhexanoic acid. Bisphenols are suitable for preparing both polycarbonates and aromatic polyesters, the so-called polyarylates. Bisphenols have a generic structural formula:

The hydroxy substituents can be substituted 2,2'-, 2-3'-, 2,4'-, 3,3'-, 3,4'- or, most suitably, 4,4'-. Other unreactive substituents can be present on the aromatic rings such as alkyls aryl, alkoxy, aryloxy, nitro, or amido moieties and the like.

The bridging moiety, R, can include methylene, 1,1-ethylene, 1,2-ethylene, 1,1-, 1,2- or 1,3- propylene or other alkyl moieties such as 1,1-cyclohexyl, oxygen, carbonyl, sulfur, sulfonyl, sulfoxy or a glycolic linkage. In the case of the polyarylates, either the free bisphenols or suitably protected bisphenols, such as bisphenol A diacetate, can be employed.

In the case of the polycarbonates, phosgene, dialkyl carbonates, diarylcarbonates or other carbonate precursors can be employed. In the case of the polyarylates, suitable diacids include terephthalic acid; isophthalic acid; naphthalenedicarboxylic acids such as naphthalene- 2,6-dicarboxylic acid; 2,2',-6,6'-tetramethyldiphenyl- 4,4'-dicarboxylic acid; and oxybisbenzoic acid.

Hydroxy aromatic acids such as 4-hydroxy benzoic acid, 3-hydroxy benzoic acid, hydroxy naphthanoic acid, hydroxy biphenyl carboxylic acids, hydroxyterphenyl carboxylic acids, and suitable derivatives can be used in the preparation of polyarylates.

In addition to the bisphenols listed above, aromatic diols such as hydroquinone, resorcinol, naphthalene diols, biphenyl diol, and terphenyl diols can be used to prepare suitable polycarbonates and polyesters.

Polyester carbonates can be prepared from any of the suitable diols, especially the bisphenols and aromatic diols, in combination with the carbonate precursors and the diacids and hydroxyacids, for example, poly(isopropylidenebiSphenolcarbonate-co-terephthalate).

The instant process is particularly well-suited for the production of polymers which are difficult to produce by the usual methods due to their high melt viscosities, such as polyamide-imides, polyarylates and aromatic polyamides. In the instant process, the dispersion of the reaction mixture through the reaction zone results in an apparent viscosity of the reaction mixture which is low. Consequently, a variety of polymers which are difficult or impossible to produce by the usual continuous processes can be readily produced by the instant process.

While the invention is described in connection with the specific Examples below, it is understood that such Examples are for illustrative purposes only. Many alternatives, modifications and variations will be apparent to those skilled in-the art in light of below Examples and such alternatives, modifications and variations fall within the scope and spirit of the intended claims.

The products in the following Examples were prepared as described in the procedure for Example 1 but specific details and results are noted for each Example hereinbelow:

EXAMPLE 1

| Monomers: | 10 mole percent adipic acid. |
| --- | --- |
| | 65 mole percent terephthalic acid |
| | 25 mole percent isophthalic acid |
| | 103 mole percent hexamethylene diamine |
| Water Content: | 15.9 weight percent |

Procedure: The diacids, diamines and water were charged to the salt reactor at room temperature. The initial charge totaled 36 lbs (50 g/mole). Additional charges were 7.2 lbs (10 g/mole) each and were fed through lock hoppers as the salt reactor was operated in a fed batch mode. The salt reactor was a 5-gallon stirred tank reactor with a pitched blade turbine, oil jacket, variable speed drive and internal coils.

Once the salt reactor had been charged, it was purged with inert gas and heated to 425° F. (218° C.). The pressure was set to 480 psig by first allowing the water in the salt to reach its equilibrium pressure and then adjusting with inert gas. In the batch operations, the salt was exposed to a range of residence times which averaged about 100 minutes. Also, as a result of the batch mode of operation, it was necessary to include a second surge vessel in the salt preparation section. This vessel, which was at 425° F. (218° C.) and 450 psig, was used to isolate the salt reactor during charge addition.

Upon leaving the salt section, the salt was passed through a 140 micron filter into a Bran and Lubbe two-headed positive displacement pump. Temperature through the pump was maintained at 425° F. (218° C.). Pressure was increased to 1800 psig in the pump. Following the pump, the salt solution was passed through a preheat zone and heated to about 600° F. (316° C.). The pressure prevented vapor formation in the preheater. Residence time in the preheater was about 40 seconds.

The salt entered the flash reactor through a Research Control Valve (RCV) where pressure was reduced from about 1800 psig to about 400 psig. The flash reactor is a tube 8 feet in length with a 0.5 inch outside diameter and a 0.375 inch inside diameter. Wall temperatures in the flash reactor were kept at about 750° F. (399° C.) using electrical heaters but the measured temperature of the reaction mixture ranged from 525° F. (274° C.) to 612° F. (322° C.), depending on location in the flash reactor. The temperatures were measured using thermocouples on the outside surface of the reactor and protruding into the reactor. (This measured temperature is referred to herein as the "mean temperature"). Pressure in the flash reactor was controlled by a second RCV. Residence time in the flash reactor was estimated at 1 second. The run had a 141 lb/hr-in$^2$ specific mass feed rate (SMFR) per unit of cross-sectional area. The minimum velocity ($V_{min}$) was calculated as described hereinbelow. The velocity two feet into the reactor was estimated as 1.15 $V_{critical}$.

After leaving the flash reactor, the polycondensate had an inherent viscosity (Phenol/Tetrachloroethane by the procedure below) of 0.20 to 0.24 dl/g. The polycondensate product from the outlet of the flash reactor will be designated in later examples as "Product I.V. Tube". It was injected directly onto the screws of the Werner & Pfleiderer ZSK-30 type extruder. The screw configuration employed with the twin-screw extruder consisted of four basic sections. The first section of the screw was a feed section composed of relatively long pitches for conveying the polymerization mixture away from the feeding port. The second section was a short compression section which compressed the polymerization mixture and provided a melt seal for the reaction zone. The reaction zone comprised about 70–80 percent of the entire length of the extruder. Typically, the screw flights had relatively long pitches, but various mixing elements or kneading blocks can also be included in this section. The final section was a compression section which fed the die. The open-screw design was used to facilitate vapor removal. A screw speed of 200 rpm was used to maintain minimum fill on the screws. Temperatures were about 620° F. (327° C.) in the injection zone but they were dropped gradually to about 600° F. (316° C.) at the die head. Following the extruder, the polymer strand was passed through a water bath and then pelletized. The mean product I.V. was 1.20 dl/g with a standard deviation of 0.09 dl/g over the 6-hour run. The I.V. of the product from the outlet of the extruder will be designated in later examples as "Product I.V. ZSK". Total production was 64 lbs of polymer.

The average residence time in the reactor was calculated based on an average of the velocities in three zones of the reactor. The inlet zone velocity in the first quarter of the reactor was assumed to be the average of the minimum velocity, $V_{min}$, and the velocity of the liquid flow at the reactor inlet. The middle zone velocity, which is between one-quarter to three-quarters of the reactor length, was assumed to be the minimum velocity, $V_{min}$. The outlet zone, from three-quarters to the end of the reactor, was assumed to be the average of the minimum velocity and the outlet velocity. The outlet velocity, a volumetric flow rate, was calculated by taking the sum of the volumetric flow rate of the first volatile component (commonly the solvent in the reaction mixture), plus the volumetric flow rate of any additional volatile components introduced, plus the volumetric flow rate of all of the reaction by-product which was not included in the calculation of the minimum velocity.

The inherent viscosity was determined herein by the following procedure. The sample was first dried at 60° C. for six hours under a vacuum of 50 mm Hg or less, if necessary. A portion of this sample weighing 0.1000±0.003 g was placed in a clean 25 ml volumetric flask. Approximately 15 ml of 60/40 (w/w) mixture of phenol and s-tetrachloroethane (TCE) were added to the volumetric flask. The flask was heated for ten minutes at about 100° C. to dissolve the sample. More phenol-TCE was added until the flask was nearly full. The flask was immersed in a thermosrated bath at 30° C. for at least 20 minutes. The sample volume was adjusted to the calibration line and the flask was returned to the thermostated bath for an additional 5 minutes. The relative viscosity, $\eta_r$, of the sample compared to solvent was then determined in a Ubbelohde viscometer from the ratio of the flow-times $t/t_0$ for the solution and solvent respectively. The inherent viscosity, I.V., of the sample was determined from the following relationship:

$$I.V. = \ln \eta_r / C$$

where $\eta_r = t/t_0$, and C is the polymer solution concentration in g/dl.

EXAMPLE 2

| | |
|---|---|
| Monomers: | 10 mole percent adipic acid |
| | 75 mole percent terephthalic acid |
| | 15 mole percent isophthalic acid |
| | 103 mole percent hexamethylene diamine |
| Water Content: | 15 weight percent |
| SMFR: | 149 lb/hr-in² |
| Residence Time: | Salt reactor 90 minutes |
| | Preheat zone 36 seconds |
| | Reactor zone 1.7 seconds |
| Reactor Wall Temp.: 700° F. | Pressure: 100 psig |
| Mean Temp.: 584° F. to 642° F. | |
| Product I.V. (Phenol/TCE): Tube 0.40 dl/g ZSK 1.20 dl/g | |
| Minimum Velocity: 1.78 $V_{critical}$ | |

These results show that a terpolymer with a different composition than in Example 1 can be readily prepared by the instant process.

EXAMPLE 3

| | |
|---|---|
| Monomers: | 85 mole percent terephthalic acid |
| | 15 mole percent isophthalic acid |
| | 103 mole percent hexamethylene diamine |
| Water Content: | 15 weight percent |
| SMFR: | 156 lb/hr-in² |
| Residence Time: | Salt reactor 90 minutes |
| | Preheat zone 36 seconds |
| | Reactor zone 0.25 seconds |
| Reactor Wall Temp.: 700° F. | Pressure: 100 psig |
| Mean Temp.: 580° F. to 660° F. | |
| Product I.V. (Phenol/TCE): Tube 0.40 dl/g ZSK 1.0 dl/g | |
| Minimum Velocity: 1.86 $V_{critical}$ | |

These results show that a polymer having a high level of terephthalic acid can be readily prepared by the instant process.

EXAMPLE 4

| | |
|---|---|
| Monomers: | 100 mole percent adipic acid |
| | 103 mole percent hexamethylene diamine |
| Water Content: | 15 weight percent |
| Residence Time: | Salt reactor 90 minutes |
| | Preheat zone 36 seconds |
| | Reactor zone 0.3 seconds |
| SMFR: | 149 lb/hr-in² |
| Pressure: | 100 psig |
| Minimum Velocity: 1.78 $V_{critical}$ | |
| Product I.V. (Phenol/TCE): Tube 0.40 dl/g ZSK 1.2 dl/g | |

This example shows that nylon 6,6 can be readily prepared by the instant process.

EXAMPLE 5

This example illustrates that a mixture of diamines can be used in the instant process.

| | |
|---|---|
| Monomers: | 85 mole percent terephthalic acid |
| | 15 mole percent isophthalic acid |
| | 99 mole percent hexamethylene diamine |
| | 4 mole percent trimethylhexamethylene |

-continued

| | |
|---|---|
| | diamine |
| Water Content: | 17 weight percent |
| SMFR: | 149 lb/hr-in$^2$ |
| Residence Time: | Salt reactor 100 minutes |
| | Preheat zone 40 seconds |
| | Reactor zone 0.3 seconds |
| Reactor Wall Temp.: 760° F. | Pressure: 100 psig |
| Mean Temp.: 570° F. to 650° F. | |
| Salt Feed Temp.: 580° F. | |
| Product I.V. (Phenol/TCE): Tube 0.20 dl/g ZSK 1.0 dl/g | |
| Minimum Velocity: 1.96 V$_{critical}$ | |

EXAMPLE 6

| | |
|---|---|
| Monomers: | 65 mole percent terephthalic acid |
| | 15 mole percent isophthalic acid |
| | 10 mole percent adipic acid |
| | 10 mole percent trimellitic anhydride |
| | 103 mole percent hexamethylene diamine |
| Water Content: | 15 weight percent |
| SMFR: | 141 lb/hr-in$^2$ |
| Residence Time: | Salt reactor 100 minutes |
| | Preheat zone 40 seconds |
| | Reactor zone 0.3 seconds |
| Reactor Wall Temp.: 750° F. | Pressure: 200 psig |
| Mean Temp.: 525° F. to 640° F. | |
| Salt Feed Temp.: 620° F. | |
| Product I.V. (Phenol/TCE): Tube 0.20 dl/g ZSK 1.01 dl/g | |
| Minimum Velocity: 1.80 V$_{critical}$ | |

The polymer prepared in this example contained imide as well as amide bond.

EXAMPLE 7

This example illustrates polymers containing both amide and imide bonds as well as aromatic and aliphatic diamines can be prepared by the instant process.

| | |
|---|---|
| Monomers: | 65 mole percent terephthalic acid |
| | 15 mole percent isophthalic acid |
| | 10 mole percent adipic acid |
| | 10 mole percent trimellitic anhydride |
| | 78 mole percent hexamethylene diamine |
| | 25 mole percent m-phenylene diamine |
| Water Content: | 13 weight percent |
| SMFR: | 149 lb/hr-in$^2$ |
| Residence Time: | Salt reactor 100 minutes |
| | Preheat zone 40 seconds |
| | Reactor zone 0.3 seconds |
| Reactor Wall Temp.: 750° F. | Pressure: 100 psig |
| Mean Temp.: 550° F. to 640° F. | |
| Salt Feed Temp.: 585° F. | |
| Product I.V. (Phenol/TCE): Tube 0.21 dl/g | |
| Minimum Velocity: 1.61 V$_{critical}$ | |

EXAMPLE 8

This example illustrates that polymers containing high levels of aromatic diamines can be prepared by the instant process.

| | |
|---|---|
| Monomers: | 100 mole percent isophthalic acid |
| | 53 mole percent hexamethylene diamine |
| | 50 mole percent m-phenylene diamine |
| Water Content: | 13 weight percent |
| SMFR: | 158 lb/hr-in$^2$ |
| Residence Time: | Salt reactor 100 minutes |
| | Preheat zone 40 seconds |
| | Reactor zone 0.3 seconds |
| Reactor Wall Temp.: 750° F. | Pressure: 100 psig |
| Mean Temp.: 590° F. to 710° F. | |
| Salt Feed Temp.: 600° F. | |
| Product I.V. (Phenol/TCE): Tube 0.16 dl/g | |
| Minimum Velocity: 1.75 V$_{critical}$ | |

EXAMPLE 9

| | |
|---|---|
| Monomers: | 50 mole percent isophthalic acid |
| | 50 mole percent trimellitic anhydride |
| | 53 mole percent hexamethylene diamine |
| | 50 mole percent m-phenylene diamine |
| Water Content: | 13 weight percent |
| SMFR: | 158 lb/hr-in$^2$ |
| Residence Time: | Salt reactor 100 minutes |
| | Preheat zone 40 seconds |
| | Reactor zone 0.3 seconds |
| Product I.V. (Phenol/TCE): Tube 0.15 dl/g | |
| Minimum Velocity: 1.75 V$_{critical}$ | |

These results show that an amide-imide polymer with high levels of aromatic diamines and high levels of imide bonds can be readily prepared. The production rate and process conditions were essentially constant compared to prior examples.

EXAMPLE 10

This example also illustrates the preparation of an amide-imide polymer with high levels of aromatic diamines, high levels of imide bonds and an extremely high melt viscosity. The process conditions were essentially the same as in Example 4 in which the polymer had a much lower melt viscosity.

| | |
|---|---|
| Monomers: | 50 mole percent isophthalic acid |
| | 50 mole percent trimellitic anhydride |
| | 101 mole percent m-phenylene diamine |
| Water Content: | 13 weight percent |
| SMFR: | 158 lb/hr-in$^2$ |
| Residence Time: | Salt reactor 100 minutes |
| | Preheat zone 40 seconds |
| | Reactor zone 0.3 seconds |
| Reactor Wall Temp.: 785° F. | Pressure: 100 psig |
| Mean Temp.: 600° F. to 700° F. | |
| Salt Feed Temp.: 600° F. | |
| Product I.V. (NMP): Tube 0.14 dl/g Solid State 0.45 dl/g | |
| Minimum Velocity: 1.75 V$_{critical}$ | |

EXAMPLE 11

This example illustrates the preparation of a totally aromatic polyamide. Such materials are not generally made by melt processes due to their high melt viscosities.

| | |
|---|---|
| Monomers: | 100 mole percent isophthalic acid |
| | 100 mole percent m-phenylene diamine |
| Water Content: | 21 weight percent |
| SMFR: | 124 lb/hr-in$^2$ |

-continued

| | | |
|---|---|---|
| Residence Time: | Salt reactor | 100 minutes |
| | Preheat zone | 40 seconds |
| | Reactor zone | 0.15 seconds |
| Reactor Wall Temp.: 850° F. | Pressure: 50 psig | |
| Mean Temp.: 525° F. to 800° F. | | |
| Salt Feed Temp.: 630° F. | | |
| Product I.V. (NMP): Tube 0.13 dl/g Solid State 0.35 dl/g | | |
| Minimum Velocity: 2.4 $V_{critical}$ | | |

EXAMPLE 12

This example illustrates the use of a moderate level of aromatic diamine to modify the polymer.

| | |
|---|---|
| Monomers: | 70 mole percent terephthalic acid |
| | 30 mole percent isophthalic acid |
| | 73 mole percent hexamethylene diamine |
| | 30 mole percent m-phenylene diamine |
| Water Content: | 13 weight percent |
| SMFR: | 124 lb/hr-in$^2$ |
| Reactor Wall Temp.: 690° F. | Pressure: 100 psig |
| Mean Temp.: 460° F. to 620° F. | |
| Salt Feed Temp.: 600° F. | |
| Product I.V. (Phenol/TCE): Tube 0.16 dl/g ZSK 1.0 dl/g | |
| Minimum Velocity: 1.33 $V_{critical}$ | |

EXAMPLE 13

| | | |
|---|---|---|
| Monomers: | 70 mole percent terephthalic acid | |
| | 30 mole percent isophthalic acid | |
| | 72 mole percent hexamethylene diamine | |
| | 30 mole percent trimethylhexamethylene diamine | |
| Water Content: | 13 weight percent | |
| SMFR: | 124 lb/hr-in$^2$ | |
| Residence Time: | Salt reactor | 100 minutes |
| | Preheat zone | 40 seconds |
| | Reactor zone | 0.36 seconds |
| Reactor Wall Temp.: 650° F. | Pressure: 100 psig | |
| Mean Temp.: 530° F. to 640° F. | | |
| Salt Feed Temp.: 630° F. | | |
| Product I.V. (Phenol/TCE): Tube 0.24 dl/g ZSK 1.0 dl/g | | |
| Minimum Velocity: 1.33 $V_{critical}$ | | |

These results show that a moderate level of a second aliphatic diamine can be added to modify the polymer properties.

EXAMPLE 14

| | | |
|---|---|---|
| Monomers: | 40 mole percent terephthalic acid | |
| | 60 mole percent isophthalic acid | |
| | 102 mole percent hexamethylene diamine | |
| Water Content: | 17 weight percent | |
| SMFR: | 137 lb/hr-in$^2$ | |
| Residence Time: | Salt reactor | 100 minutes |
| | Preheat zone | 50 seconds |
| | Reactor zone | 0.28 seconds |
| Reactor Wall Temp.: 650° F. | Pressure: 100 psig | |
| Mean Temp.: 525° F. to 630° F. | | |
| Salt Feed Temp.: 625° F. | | |
| Product I.V. (Phenol/TCE): ZSK 1.14 dl/g | | |
| Minimum Velocity: 1.77 $V_{critical}$ | | |

These results show that an amorphous polyamide can be produced at a low mean temperature. The results also show that the present process is useful in preparing polymers which can be made by conventional processes.

EXAMPLE 15

| | |
|---|---|
| Monomers: | 103 mole percent neopentyldiamine |
| | (2,2 dimethylpropanediamine) |
| | 40 mole percent terephthalic acid |
| | 60 mole percent isophthalic acid |
| Water Content: | 15 weight percent |
| Salt Reactor: | 450° F. |
| | 450 psig |
| Preheat: | 570–610° F. |
| | 1500–2000 psig |
| Reactor: | Wall Temp.: 700° F. |
| | Mean Temp.: 600° F. |
| | Pressure: 50 psig |
| | Residence Time: 0.2 seconds |
| SMFR: | 122 |
| ZSK Extruder: | Max. Temp.: 615° F. |
| | Atmospheric pressure |
| Product I.V.: | 0.07 dl/g |
| Minimum Velocity: 1.0 $V_{critical}$ | |

In this example, the preheat section was operated above the degradation temperature of the diamine. Discolored product was formed and ammonia was produced.

EXAMPLE 16

| | |
|---|---|
| Monomers: | 102 mole percent hexamethylene diamine |
| | 65 mole percent terephthalic acid |
| | 25 mole percent isophthalic acid |
| | 10 mole percent adipic acid |
| | 0.25 mole percent benzoic acid |
| Salt Reactor: | 450° F. |
| | 450 psig |
| | 15 weight percent water |
| Preheat: | 465° F. |
| | 1800 psig |
| Reactor: | Wall Temp.: 700° F. |
| | Mean Temp.: 395–525° F. |
| | Pressure: 50 psig |
| | Residence Time: 0.24 seconds |
| SMFR: | 106 |
| ZSK Extruder: | Max. Temp.: 615° F. |
| | Atmospheric pressure |
| Product I.V.: | 0.42 dl/g |

This polymerization was carried out using a lower preheat temperature than in Example 1. The molecular weight of the polymer product from the ZSK was relatively low (I.V. 0.42 dl/g) and surprisingly did not increase when the product was dried and fed into the extruder a second time (I.V. dropped to 0.35 dl/g). These results show the importance of maintaining a high preheat temperature.

EXAMPLE 17

| | |
|---|---|
| Monomers: | 65 mole percent terephthalic acid |
| | 25 mole percent isophthalic acid |
| | 10 mole percent adipic acid |
| | 0.25 mole percent benzoic acid |
| | 102 mole percent hexamethylene diamine |
| Water Content: | 25 weight percent |
| SMFR: | 75.2 |

-continued

| Residence Time: | Salt Reactor: | 90 minutes |
| --- | --- | --- |
|  | Preheat Zone: | 1.5 minutes |
|  | Reactor Zone: | unknown |
|  | Extruder: | 5 minutes |
| Reactor Wall Temperature: 700° F. | | Pressure: 200 psig |
| Mean Temperature: 582° F. | | |
| Mean Extruder Temperature: 590° F. | | |
| Product I.V. (Phenol/TCE) 1.69 dl/g | | |
| Minimum Velocity: 0.96 $V_{critical}$ | | |

Process operation deteriorated with control problems at the outlet of the reactor and surges in product from the extruder. Product color deteriorated significantly. A large number of gels were reported in both I.V. and GPC samples. Molecular weight distributions as measured by gel permeation chromotography showed substantial broadness when compared to typical products. Problems disappeared and product returned to normal when the flow was increased to a SMFR of 112.5 lb/hr-in².

EXAMPLE 18

| Monomers: | 65 mole percent terephthalic acid |
| --- | --- |
|  | 25 mole percent isophthalic acid |
|  | 10 mole percent adipic acid |
|  | 1 mole percent benzoic acid |
|  | 102 mole percent hexamethylene diamine |
| Water Content: | 15.9 weight percent |
| SMFR: | 159 |
| Reactor Wall Temperature: 640° F. | |
| Mean Temperature: 542–646° F. | |
| Product I.V.: Tube 0.25 dl/g ZSK 0.80 dl/g | |
| Minimum Velocity: 1.97 $V_{critical}$ | |

The reactor consisted of four 9 foot long stainless steel tubes each with a 0.5 inch internal diameter and 0.065 inch thick walls. The tubes were mounted in a common jacket using oil as the heating medium flowing cocurrently with the flow of the reaction mixture through the tubes. Pressure was maintained in the reactors by a single common RCV at the outlet of the tube reactors. Flows in the individual tube reactors were controlled by separate RCV's mounted at the inlet of each tube.

EXAMPLE 19

| Monomer: | Hexamethylene diammonium adipate obtained as a salt solution in water from Monsanto |
| --- | --- |
| Water Content: | 50 weight percent |
| Salt Feed Temp. | 645° F. |
| SMFR: | 119 |
| Reactor: | Wall Temp: 700–760° F. |
|  | Pressure: 100 psig |
| Mean Temp: | 500–615° F. |
| Residence Time: | Salt Reactor: 2–5 hours |
|  | Preheat: 45 seconds |
|  | Reactor: 0.15 seconds |
|  | ZSK: 4 minutes |

These results show that the instant process works well even when a dilute monomer solution is used.

EXAMPLE 20

In this example a heated salt solution was flashed without passing through the reactor of the instant process. This was done to simulate the process of depressurizing a heated salt solution.

| Monomers: | 65 mole percent terephthalic acid |
| --- | --- |
|  | 25 mole percent isophthalic acid |
|  | 10 mole percent adipic acid |
|  | 0.25 mole percent benzoic acid |
|  | 102 mole percent hexamethylene diamine |
| Water Content: | 15.9 weight percent |

The monomers were added to the salt reactor at room temperature. The reactor was then sealed and purged with nitrogen and pressured to 100 psig. The salt solution was then heated to 450° F. at which time the solution was flashed into a cold receptacle under nitrogen.

The solid collected in the receptacle had an inherent viscosity of 0.10 dl/g. The number average molecular weight as determined by gel permeation chromatography (GPC) was 584 corresponding to a degree of polymerization ($\overline{DP}$) of 4.79 and an extent of reaction ($\overline{X}$) of 0.791.

The instrumentation for GPC consisted of the following Millipore Waters components: M6000A pump, auto injection system, R-401 differential refractometer, and a data acquisition system. The column set was three silonized silica columns manufactured by Dupont (Zorbox PSM-3000-S, Zorbox PSM-1000-S, and Zorbox PSM-300-S. The mobile phase was 0.01M sodium trifluoroacetate in hexafluoroisopropanol. The sample concentration was 0.05 (w/v) percent, the injected sample volume was 250 µL, and the flow rate was 0.4 mL/min. A linear calibration curve was based upon narrow polydispersity polymethylmethacrylate samples with molecular weights of 525000, 240000, 125000, and 79000.

EXAMPLE 21

Method A

| Monomers: | 65 mole percent terephthalic acid |
| --- | --- |
|  | 25 mole percent isophthalic acid |
|  | 10 mole percent adipic acid |
|  | 103 mole percent hexamethylene diamine |
|  | 800 parts per million Na $H_2PO_2$ promoter |
| Water Content: | 15.9 weight percent |

The monomers were combined in a salt reactor in water and heated to 450° F. and pressured to 450 psig under nitrogen. The salt solution was then flashed into a sample receiver chilled with ice, at a rate of 6.5 pounds/hour. Recovered polycondensate product with an I.V. of 0.11 was then ground and fed to a ZSK-30 extruder. Conditions and results are given in the table hereinbelow.

Method B

| Monomers: | Same as in Method A |
| --- | --- |
| Water Content: | 15.9 weight percent |

In a series of polymerization runs, salt solutions prepared at 450° F. and 950 psig were passed through a preheat zone at 620° F. and into a reactor as in Example 1. The salt solution was fed at the rate of 13 pounds per hour. Polycondensate product with an I.V. of 0.25 was recovered on a chilled sample receiver, ground, dried, and then fed to a ZSK-30 extruder. Extruder, conditions and results are given in the table hereinbelow.

| Sample: | Method A | Method B |
|---|---|---|
| Polycondensate I.V.: | 0.11 | 0.25 |
| ZSK: | | |
| Polycondensate Fed: | 9 lb/hr | 20 lb/hr |
| Temp. Zone 1 | 515° F. | 415° F. |
| 2 | 660 | 540 |
| 3 | 675 | 640 |
| 4 | 665 | 630 |
| 5 | 660 | 590 |
| 6 | 590 | 590 |
| Mean Temp. | 628 | 568 |
| Product I.V. | 0.80 | 1.22 |
| Color | dark yellow to brown | light yellow to white |

The degree of polymerization and percent conversion for these two cases are as follows, where "theoretical" is the percent of theoretical reaction occurring after that due only to flashing.

| I.V. | DP | Percent Conversion | Theoretical |
|---|---|---|---|
| 0.11 | 4.75 | 79.0 | 0 |
| 0.25 | 19.5 | 94.9 | 76 |
| 0.80 | 28.2 | 96.5 | 83 |
| 1.22 | 43.6 | 97.7 | 89 |

These results show that the amount of condensation which occurs simply as the result of pressure reduction or flashing is slight. It is also apparent that passing the material obtained from the simple flash step through an extruder, even at such elevated temperatures, that discoloration occurs, does not provide the high molecular weight polymer of the instant process.

We claim:

1. An apparatus for preparing a condensation polymer, said apparatus comprising:

mixing means for mixing reactants to form a feed mixture;

pressurizing means connected to said mixing means for pressurizing said feed mixture;

heating means for receiving said pressurized feed mixture from said pressurizing means and heating said mixture;

at least one reactor connected to said heating means, said reactor comprising means for heating said reactor to temperatures of about 400° F. to about 1000° F. and designed to maintain turbulent flow of a dispersion of particles of liquid or solid in a continuous vapor phase;

means for forming a dispersion of particles of liquid or solid in a continuous vapor phase from said heated feed mixture, said means located at an entrance to said reactor;

throttling means located at an exit from said reactor to control the pressure in said reactor; and finishing means connected to the exit from the reactor to post-polymerize a reactor product.

2. The apparatus of claim 1 wherein said means for forming a dispersion is an orifice sized to allow a stream of feed mixture to pass therethrough while maintaining pressure of the feed mixture in said heating means and allowing volatile components in the feed mixture to flash into a lower pressure region in the reactor.

3. The apparatus of claim 2 wherein said orifice is a valve.

4. The apparatus of claim 2 wherein said reactor is tubular in shape.

5. The apparatus of claim 4 wherein said throttling means is a valve.

6. The apparatus of claim 1 wherein said reactor comprises a plurality of reactors 7. The apparatus of claim 6 wherein said reactors are tubular in shape.

8. The apparatus of claim 7 wherein said means for forming a dispersion comprises a plurality of orifices with one such orifice located at the entrance to each such reactor.

9. The apparatus of claim 1 wherein the finishing means is mounted at the exit of said reactor.

10. The apparatus of claim 9 wherein said finishing means is an extruder.

11. The apparatus of claim 10 wherein said extruder is a twin-screw extruder.

12. An apparatus for preparing a condensation polymer, said apparatus comprising:

a stirred vessel for mixing reactants to form a feed mixture;

a pump connected to said vessel for pressurizing said feed mixture;

a conduit connected to said pump for receiving said pressurized feed mixture, said conduit comprising means for increasing temperature of the pressurized feed mixture over at least a portion of the conduit;

a plurality of heated, parallel tubular reactors connected to said conduit for heating a dispersion formed from said feed mixture, said heated tubular reactors designed to maintain turbulent flow of a dispersion of particles of liquid or solid in a continuous vapor phase therethrough and comprising means for heating the reactors to temperatures of about 400° F. to about 1000° F. to provide a heat flux to the dispersion;

a plurality of orifices with one such orifice located at an entrance to each of said reactors for forming a dispersion of particles of liquid or solid in a continuous vapor phase from said heated feed mixture each such orifice being sized to allow a stream of said feed mixture to pass therethrough while maintaining pressure of the feed mixture in said conduit and allowing volatile components in the feed mixture to flash into a lower pressure region in the reactor:

a valve located at an outlet of such tubular reactors to control the pressure in said reactors; and a post-polymerization finishing reactor connected to such tubular reactors for receiving a product from such tubular reactors and post-polymerizing said product.

13. The apparatus of claim 12 wherein said finishing reactor is an extruder.

14. The apparatus of claim 12 wherein said tubular reactors are about 6 to about 20 feet long and have an internal diameter of about 0.3 to about 1.0 inch.

* * * * *